Aug. 19, 1952  R. G. SHEIDLER  2,607,875
INDICATOR FOR ELECTRIC RANGES
Filed May 23, 1950  3 Sheets-Sheet 1

INVENTOR.
Robert G. Sheidler
BY
Chas. H. Trotter
Atty.

Aug. 19, 1952                R. G. SHEIDLER                2,607,875
                      INDICATOR FOR ELECTRIC RANGES
Filed May 23, 1950                                      3 Sheets-Sheet 2

INVENTOR.
Robert G. Sheidler
BY Chas. H. Trotter
Atty.

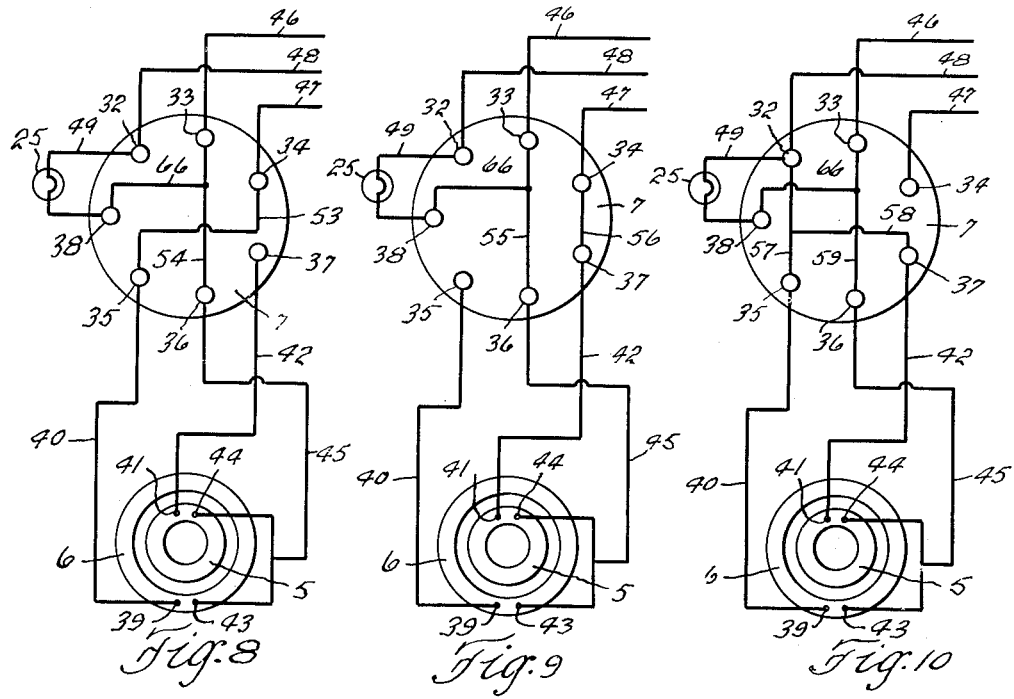
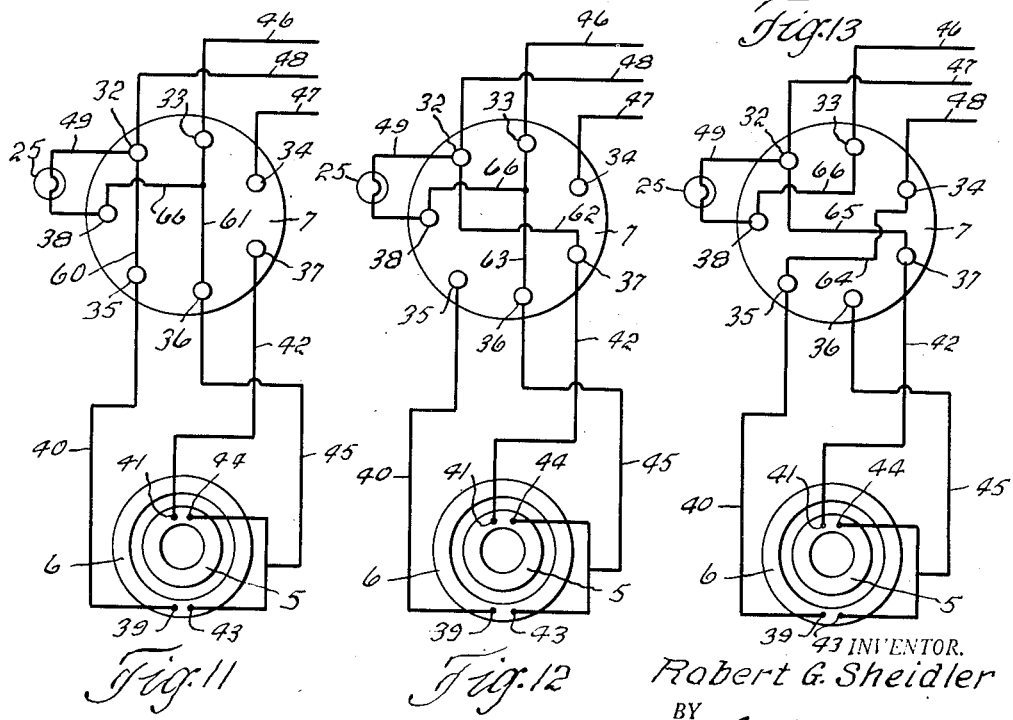

Patented Aug. 19, 1952

2,607,875

UNITED STATES PATENT OFFICE 2,607,875

INDICATOR FOR ELECTRIC RANGES

Robert G. Sheidler, Mansfield, Ohio, assignor to The Tappan Stove Company, Mansfield, Ohio, a corporation of Ohio Application May 23, 1950, Serial No. 163,756

4 Claims. (Cl. 219—20)

This invention relates to indicators for electric cooking ranges by which one can tell at a glance the condition of an electric heating unit therein. It is especially designed and adapted for use on electric cooking ranges wherein the energization of the heating units is controlled by standard switches of the push button type; and it is a modification of the mechanism shown in my copending application, Serial No. 153,654, filed April 3, 1950. The subject matter of the present application is also related to that of my copending application, Serial No. 146,453, filed February 27, 1950.

Standard electric heating units for cooking ranges generally comprise a pair of concentrically arranged resistance elements which are adapted to be energized either in conjunction with each other or independently of each other in varying degree in order to generate different amounts of heat. As shown herein the energization of the resistance elements is controlled by a suitable standard switch of the push button type.

The embodiment of my invention disclosed herein is shown and described in connection with a heating unit having two concentrically arranged standard resistance heating elements which are adapted to be connected by a standard push button switch to a three-wire 220 volt transmission system. The switch is arranged to selectively supply current to the resistance elements at either 220 or 110 volts. The two elements may be simultaneously connected to the transmission system or either one alone may be connected thereto. For the purpose of illustration I have shown a heating unit having an outer heating element, which will produce 700 watts at 220 volts, and an inner heating element which will produce 500 watts at 220 volts. At 110 volts the outer and inner elements will produce 175 and 125 watts, respectively. From this it follows that when the outer and inner elements are simultaneously energized in parallel at 220 volts the unit will produce 1200 watts; and when the elements are simultaneously energized at 110 volts in parallel the unit will produce 300 watts. When the outer element alone is energized the unit will produce 700 watts at 220 volts and 175 watts at 110 volts; and when the inner element alone is energized the unit will produce 500 watts at 220 volts and 125 watts at 110 volts. When the outer and inner elements are simultaneously energized in series at 110 volts the unit will produce 75 watts. From this it will be seen that the unit may be selectively set by the switch to produce either 1200 watts, 700 watts, 500 watts, 300 watts, 175 watts, 125 watts or 75 watts. Generally when cooking the heating unit is substantially covered by the cooking utensil. Consequently one cannot see the heating elements to tell how they are energized. Furthermore even when the elements are exposed to view it is not always possible to tell by looking at them just which element is energized and how it is energized especially at 110 volts. Therefore I provide a visual indicator by which one can tell at a glance the exact condition of a heating unit.

For the most efficient and economical operation of a heating unit in an electric cooking range it is not only necessary for one to know whether a heating unit is generating high, medium or low etc., heat but it is also very essential that one know which element or elements of a two element heating unit is energized and to what degree. In cooking it is generally customary to first set a heating unit at its highest heat generating capacity to quickly heat food up to the proper cooking temperature and then set the unit for a lower heat which is just sufficient to maintain the food at the proper cooking temperature. For instance in boiling vegetables or other food the heating unit is first set at a high heat and as soon as the water commences to boil the unit is set for a lower heat which is just sufficient to keep the water boiling. But the highest heat generating capacity of the unit in many instances may not be the proper setting for efficiently and economically quickly raising food to cooking temperature. Using the two element heating unit described herein, in which the inner and outer elements together generate the highest heat, the outer element alone the second highest heat and the inner element alone the third highest heat, let us assume that one wants to boil food in a utensil which covers only the inner heating element. Under this condition the inner element alone should be energized for initially bringing the water to boiling temperature. If both elements were energized the heat from the outer element would be completely wasted, passing up around the outside of the utensil and heating only the handle thereof. If the outer element alone was energized practically all of the heat would be lost and none applied to the utensil and the contents thereof; whereas with the inner element alone all of the heat generated thereby would be applied to the utensil thereover without any loss. And there are many other occasions during cooking when it is essential for best results to know which element or elements is energized and to what degree, instead of merely knowing that a unit is set to generate high, medium or low etc., heat.

My improved indicator is incorporated in the push buttons of a standard switch of the push button type. In switches of this type a plurality of push buttons are usually arranged in an annular row about a central button. Each button in the annular row controls a different setting of the switch and through the switch determines the energization of the heating unit. The construction of the switch is such that one may selectively energize the heating elements of a heating unit as desired within the capacity of the switch and the heating unit. The central push button is provided to return the control buttons to their normal off positions. For example, let us assume that one wishes to energize a heating unit to produce its full capacity of 1200 watts. To do this he selects the proper button and depresses it which sets the switch to supply current at 220 volts in parallel to both the inner and outer heating elements. The push button will remain depressed and the switch will remain in this setting until the center button is depressed. The momentary depressing of the center button will return the switch mechanism and the depressed button back to their normal off positions.

In accordance with my invention, I incorporate in each push button a design which simulates the heating unit and the condition of the heating elements thereof when that particular button is depressed to energize the heating unit. When the control buttons are in their normal off position the designs incorporated therein are invisible. In order to render a design clearly visible when a button is depressed to energize the heating unit, I provide means through which the design is illuminated only when the button is depressed.

In the designs simulating the heating elements I use four different colors to indicate different conditions of the heating unit and the heating elements therein, preferably red, orange, yellow and black. Red indicates that 220 volts are applied in parallel to an element or elements; orange indicates that 110 volts are applied in parallel to an element or elements; yellow is used to indicate that 110 volts are applied in series to the two elements of the unit, and black indicates that an element is not energized. To illustrate the use of the indicator, let us assume that the design rendered clearly visible shows both elements red. This indicates that both elements are energized at 220 volts. If the design shows the outer element red and the inner element black it indicates that the outer element is energized at 220 volts and that the inner element is not energized. Likewise if the design shows the inner element orange and the outer element black it indicates that the inner element is energized at 110 volts and that the outer element is not energized.

The principal object of the invention is to provide a very simple, efficient and inexpensive indicating and control mechanism for visually indicating which element or elements of a two element heating unit which is controlled by a push button switch in a cooking range is energized and to what degree.

Another object of the invention is to provide an indicating and control mechanism of this character which is controlled by the operation of the heating unit control switch.

Another object of the invention is to provide an indicating and control mechanism of this character which comprises a plurality of designs which simulate various different conditions of a two element heating unit.

Another object of the invention is to provide an indicating and control mechanism of this character, for use in conjunction with a push button switch, which comprises a plurality of designs each of which simulates a different condition of a heating unit, there being a different design incorporated in each control push button.

Other and more limited objects of the invention will be apparent from the following specification and the accompanying drawings forming a part thereof wherein:

Figs. 7 to 13, inclusive, are wiring diagrams, diagrammatically showing the various switching arrangements by which the heating unit is controlled.

Figures 1, 2:
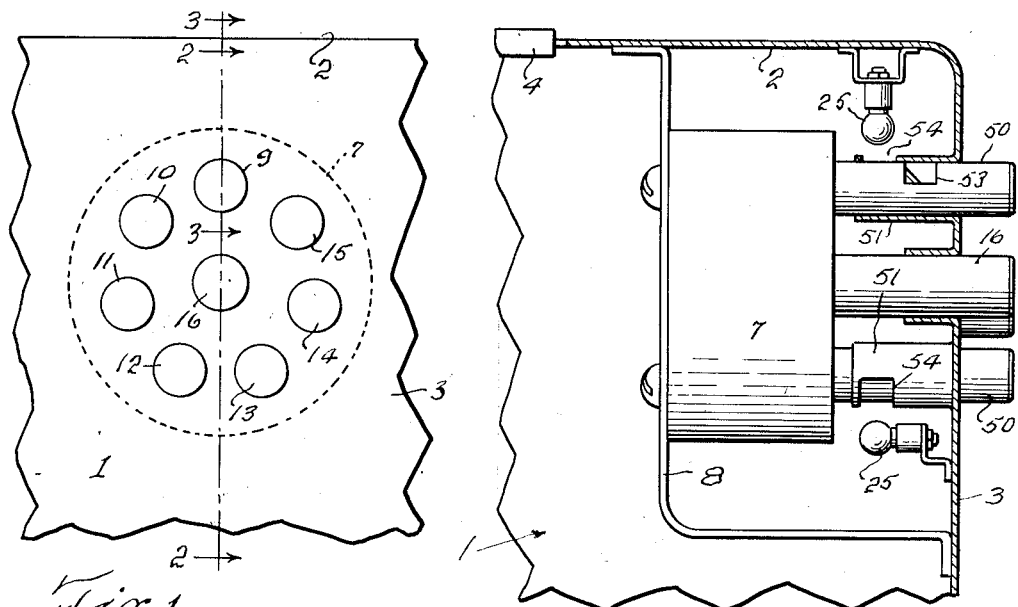
Fig. 1 is a fragmentary front elevation of a portion of an electric cooking range showing the push buttons of a control switch of the push button type extending through the front wall of the range.
Fig. 2 is a vertical section taken on the line 2—2 of Fig. 1, with the switch and push buttons thereof being shown in side elevation.
Figure 6:
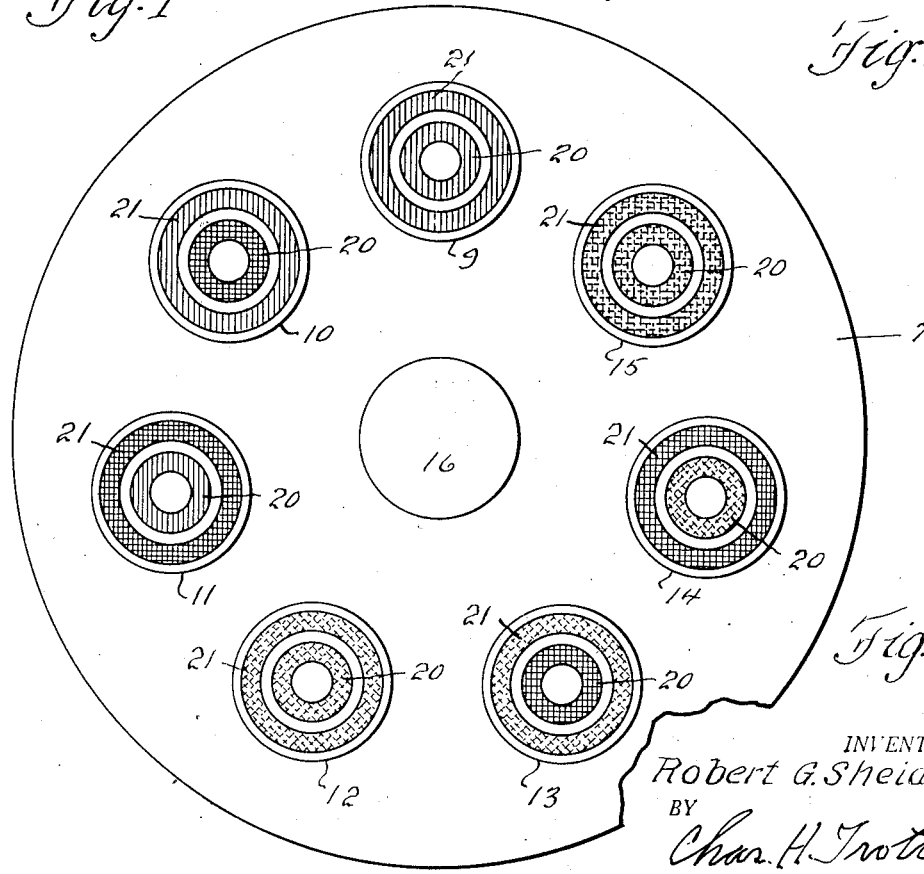
Fig. 6 is a front elevation, on the same scale as Figs. 3 to 5, of the switch and showing the various designs incorporated in the different push buttons.

Referring now to the drawings by reference characters, the numeral 1 indicates generally an electric cooking range having the top wall 2 and the front wall 3. An electric heating unit 4 having inner and outer concentric standard resistance heating elements 5 and 6 is suitably supported by the top 2 of the range. The energization of the heating elements 5 and 6 is controlled by a switch 7 by which the elements 5 and 6 are selectively connected to a three-wire, 220 volt transmission system. The switch 7 which is suitably secured to a bracket 8 within the range is a seven-heat push button switch of standard well known construction. Consequently it is not illustrated in detail herein. The switch 7 has seven control push buttons 9, 10, 11, 12, 13, 14 and 15, arranged in an annular row, and a central reset button 16. Each of the control buttons 9 to 16 when depressed sets the switch mechanism in a different position, and each setting of the switch operates to energize the heating element 4 in a different manner. With this arrangement the switch 7 may be selectively set to energize the resistance elements 5 and 6 as desired. As previously stated, after depressing any control button it will remain depressed until the reset button 16 is momentarily depressed after which the depressed button and the switching mechanism will return to their normal off position, and de-energize the resistance elements 5 and 6.

In order that one may know the setting of the switch 7 and consequently the condition of the heating elements 5 and 6 of the heating unit 4, I provide visual indicating means by which one can tell at a glance the exact condition of a heating unit. To this end I incorporate in each of the push buttons 9 to 15 a design consisting of two concentric rings 20 and 21 which simulate the inner and outer resistance elements 5 and 6 of the heating unit 4. When the push buttons are in their normal off positions the designs therein are invisible but when a push button is depressed to energize the heating unit the design therein is rendered clearly visible by an electric light bulb. There is one electric light bulb 25 associated with each push button, each of which is energized by the actuation of its respective push button.

In order to simulate the condition of the resistance elements I have colored the rings in the various buttons using a different arrangement of colors in each button. In button 9 I have colored both the inner and outer rings 20 and 21 red. In button 10 I have colored the outer ring 21 red and the inner ring 20 black. In button 11 I have colored the inner ring 20 red and the outer ring 21 black. In button 12 I have colored both the inner ring 20 and the outer ring 21 orange. In button 13 the outer ring 21 is colored orange and the inner ring 20 is colored black. In button 14 the inner ring 20 is colored orange and the outer ring 21 is colored black; and in button 15 both rings are colored yellow. As previously stated, I use the color red to indicate that a heating element is energized at 220 volts; the color orange to indicate that a heating element is energized at 110 volts, and the color yellow to indicate that both elements are energized in series at 110 volts.

Figure 7:
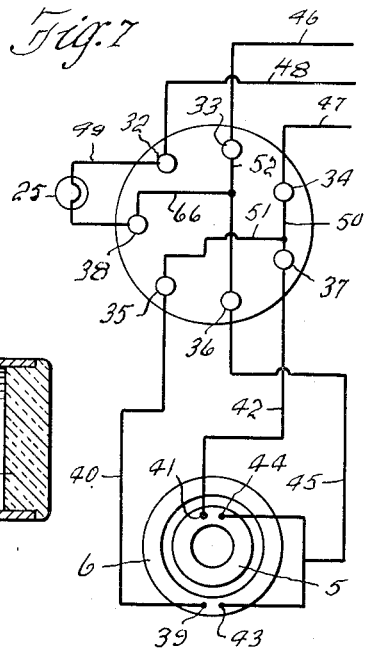

The switching arrangement controlled by button 9 is shown in Fig. 7; that controlled by button 10 is shown in Fig. 8; that controlled by button 11 is shown in Fig. 9; that controlled by button 12 is shown in Fig. 10; that controlled by button 13 is shown in Fig. 11; that controlled by button 14 is shown in Fig. 12, and that controlled by button 15 is shown in Fig. 13.

Referring now to Figs. 7 to 13, inclusive, the switch 7 is shown as having seven terminals as indicated at 32, 33, 34, 35, 36, 37 and 38, respectively. The terminal 39 of the outer heating element 6 is connected to the terminal 35 of the switch 7 by the wire 40, and the terminal 41 of the inner heating element 5 is connected to the terminal 37 of the switch by a wire 42. The terminal 43 of the outer heating element 6 and the terminal 44 of the inner heating element 5 are each connected to the terminal 36 of the switch 7 by the wire 45. The three wires of a 220 volt, three-wire transmission system are indicated at 46, 47 and 48. Wires 46 and 47 together will supply current at 220 volts, and either of wires 46 or 47 with neutral wire 48 will supply current at 110 volts. Transmission wire 46 is connected to the terminal 33 of the switch 7 and the wire 47 is connected to the terminal 34 of the switch 7. The neutral wire 48 is connected to the terminal 32 of the switch. The electric bulb 25 is connected to the terminals 32 and 38 of the switch 7 by the wire 49. Assuming that the outer heating element 6 will produce 700 watts at 220 volts and 175 watts at 110 volts and that the inner heating element 5 will produce 500 watts at 220 volts and 125 watts at 110 volts, the heating unit 4 will produce 1200 watts when the switch 7 is set as shown in Fig. 7. At this setting the terminal 34 is connected to the terminals 37 and 35 by the lines 50 and 51, and the terminal 33 is connected to the terminal 36 by the line 52. Current will then flow from the wire 46 through line 52 and wire 45 to the terminal 44 of the inner element 5 and to the terminal 43 of the outer element 6. After passing through the inner element 5 the current will flow back to the wire 47 from the terminal 41 through the wire 42 and line 50; and after passing through the outer element 6 the current will flow back to the wire 47 from the terminals 39 through the wire 40 and lines 51 and 50. From this it will be seen that both of the elements 5 and 6 are energized in parallel at 220 volts.

Fig. 8 shows the switch 7 set to energize the outer element 6 only at 220 volts. In this setting the terminal 34 is connected to the terminal 35 by the line 53 and the terminal 33 is connected to the terminal 36 by the line 54. Current will then flow from the wire 46 through the line 54 and wire 45 to the terminal 43 of the outer element 6, and after passing through the element 6 the current will flow from the terminal 39 back to the wire 47 through the wire 40 and line 53.

Fig. 9 shows the switch 7 set to energize the inner element 5 only at 220 volts. In this setting the terminal 33 is connected to the terminal 36 by the line 55, and the terminal 34 is connected to the terminal 37 by the line 56. Current will then flow from the line 46 through the line 55 and wire 45 to the terminal 44 of the inner element 5, and after passing through the element 5 the current will flow from the terminals 41 back to the wire 47 through the wire 42 and line 56.

Fig. 10 shows the switch 7 set to energize the inner and outer elements 5 and 6 in parallel at 110 volts. In this setting the terminal 32 is connected to the terminals 35 and 37 by the lines 57 and 58, and the terminal 33 is connected to the terminal 36 by the line 59. Current will then flow from the wire 46 through the line 59 and wire 45 to the terminal 43 of the outer element 6 and to the terminal 44 of the inner element 5. After passing through the outer element 6 the current will flow from the terminal 39 back to the neutral wire 48 through the wire 40 and line 57; and after passing through the inner element 6 the current will flow from the terminal 41 back to the neutral wire 48 through the wire 42 and line 58.

Fig. 11 shows the switch 7 set to energize the outer element 6 at 110 volts. In this setting the terminal 32 is connected to the terminal 35 by the line 60, and the terminal 33 is connected to the terminal 36 by the line 61. Current will then flow from the wire 46 through the line 61 and wire 45 to the terminal 43 of the outer element 6 and after passing through the element 6 the current will flow from the terminal 39 back to the neutral wire 48 through the wire 40 and line 60.

Fig. 12 shows the switch 7 set to energize the inner element 5 only at 110 volts. In this setting the terminal 32 is connected to the terminal 37 by the line 62 and the terminal 33 is connected to the terminal 36 by the line 63. Current will then flow from the wire 46 through the line 63 and wire 45 to the terminal 44 of the inner element 5, and after passing through the element 5 the current will flow from the terminal 41 back to the neutral wire 48 through the wire 42 and the line 62.

Fig. 13 shows the switch 7 set to energize the inner and outer elements 5 and 6 in series at 110 volts. In this setting the terminal 34 is connected to the terminal 35 by the line 64, and the terminal 32 is connected to the terminal 37 by the line 65. Current will then flow from the wire 47 through the line 64 and wire 40 to the terminal 39 of the outer element 6 and then through the element 6, after which it flows from the terminal 43 of the element 6 through the wire 45 to the terminal 44 of the inner element 5. From the terminal 44 the current flows through the inner element 5 and from the terminals 41 back to the neutral line 48 through the wire 42 and line 65. In all the operative setting of the switch 7, the terminal 33 is connected to the terminal 38 by the line 66 so that an electric light bulb 25 will always be energized whenever the switch is set in an operative position.

Figure 3:
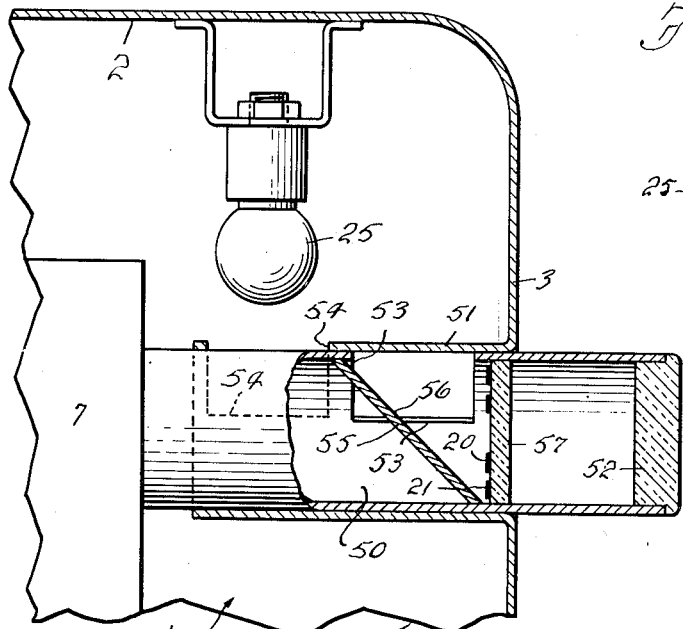
Fig. 3 is an enlarged vertical section taken on the line 3—3 of Fig. 1, with the control push button in normal off position, the switch housing being shown in side elevation.
Figure 4:
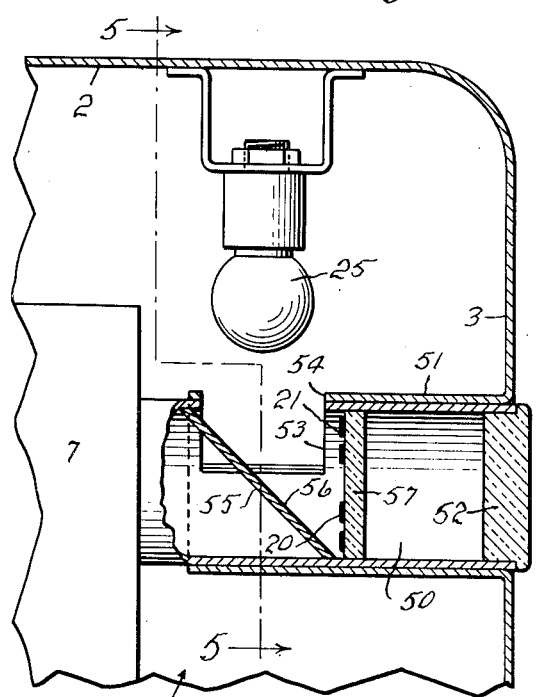
Fig. 4 is a view similar to Fig. 3 with the control push button depressed to set the switch in position to energize a heating unit.
Figure 5:
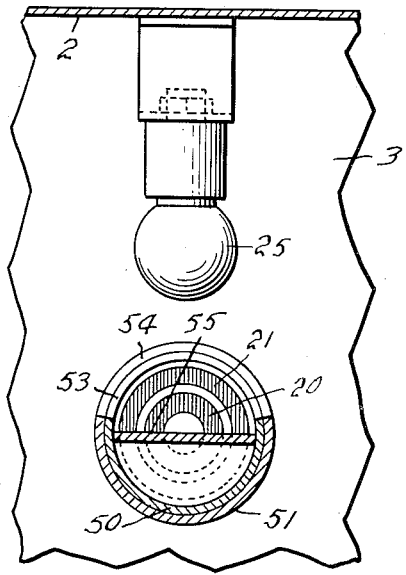
Fig. 5 is a vertical section taken on the line 5—5 of Fig. 3.

Referring now to Figs. 1 to 6 of the drawings, each of the control push buttons 9 to 15 comprises a cylindrical metallic tube 50 which is operatively connected to the switch 7 and extends outwardly therefrom and through a sleeve 51 which is secured to and extends inwardly from the inner face of the front wall 3 of the range. The outer end of the tube 50 is closed by a plug 52 of any suitable translucent material. The tube 50 has a window 53 therein and the sleeve 51 has a window 54 therein. The windows 53 and 54 are so positioned with respect to each other that they will be completely out of register with each other when a push button is in an off position as shown in Fig. 3, and will register with each other when a push button is in an on position as shown in Fig. 4. The electric light bulbs 25 are located opposite the windows 54 in position to project light therethrough. A partition 55 having a mirrored surface 56 is rigidly secured in a diagonal position within the tube 50 behind the window 53 thereof. Between the window 53 and the plug 52 is rigidly secured a disc 57 of any suitable transparent material. The disc 57 is disposed perpendicular to the axis of the tube 50 and has the two colored concentric rings 20 and 21 which simulate the heating elements 5 and 6 painted or otherwise suitably applied to the rear face thereof.

When a push button is in normal off position, as shown in Fig. 3, the colored rings 20 and 21 therein which simulate the condition of the heating elements 5 and 6 of the heating unit 4 as controlled by that button are invisible. But when a push button has been depressed as shown in Fig. 4 to energize the heating elements 5 and 6, the colored rings 20 and 21 therein are rendered clearly visible through the translucent plug 52 by light from the bulb 25 which is projected through the registering windows 53 and 54 and against the mirrored surface 56 which reflects it axially of the tube 50 through the disc 57 and plug 52.

From the foregoing it will be apparent that I have provided very simple and efficient means for accomplishing the objects of my invention.

It is to be understood that I am not limited to the specific construction shown and described herein as various modifications may be made therein within the spirit of the invention.

What is claimed is:

1. An indicating and control mechanism for a cooking range electric heating unit having inner and outer heating elements, said mechanism comprising switching means by which the energization of said heating elements is selectively controlled, a plurality of push buttons by which said switching means is set to selected positions, each push button controlling a different setting of said switching means, a plurality of designs which are invisible when said switch is set in off position, each of said designs comprising two concentric colored rings which simulate the inner and outer heating elements of the heating unit, each of said designs having a different arrangement of colors to indicate different degrees of energization of the heating elements, one of said designs being incorporated in each of said push buttons; and means rendered operable by the depressing of a push button, in setting said switching means in a selected on position, to illuminate the design incorporated therein and thereby render said design clearly visible; each of said designs indicating which element or elements is energized and to what degree in accordance with the setting of said switch when a selected push button is depressed.

2. An indicating and control mechanism for a cooking range electric heating unit having inner and outer heating elements, said mechanism comprising switching means by which the energization of the inner and outer heating elements of a heating unit is selectively controlled, a plurality of push buttons by which said switching means is manually set in selected positions, each push button controlling a different setting of said switching means, a plurality of different designs each of which comprises two concentric colored rings which simulate the inner and outer heating elements of a heating unit, each of said designs having a different arrangement of colors to indicate different degrees of energization of the heating elements, each of said push buttons comprising a tubular member having the outer end thereof closed by a plug through which light may pass, one of said designs being disposed in each of said tubular members rearwardly of said plugs, and means rendered operable by the depressing of a push button in setting said switching means in a selected on position to project light through the design and plug carried thereby, each of said designs indicating which element or elements is energized and to what degree in accordance with the setting of said switch when a selected push button is depressed.

3. An indicating and control mechanism for a cooking range electric heating unit having inner and outer heating elements, said mechanism comprising switching means by which the energization of the inner and outer heating elements of a heating unit is selectively controlled, a plurality of push buttons by which said switching means is manually set in selected positions, each push button controlling a different setting of said switching means, a plurality of different designs each of which comprises two concentric colored rings which simulate the inner and outer heating elements of a heating unit, each of said designs having a different arrangement of colors to indicate different degrees of energization of the heating elements, each of said push buttons comprising a tubular member having the outer end thereof closed by a plug through which light may pass, a window in the wall of said tubular member, a reflector disposed in said tubular member behind said window in position to reflect light axially of said tubular member and through said plug, one of said designs being mounted in each of said tubular members between the reflector and the plug carried thereby, and means operative to project light through said window and against said reflector when a push button is moved from an off position to an on position, each of said designs indicating which element or elements is energized and to what degree in accordance with the setting of said switch when a selected push button is in an on position.

4. An indicating and control mechanism for a cooking range electric heating unit having inner and outer heating elements, said mechanism comprising switching means by which the energization of the inner and outer heating elements of a heating unit is selectively controlled, a plurality of push buttons by which said switching means is manually set in selected positions, each push button controlling a different setting of said switching means, a plurality of different designs each of which comprises two concentric colored rings which simulate the inner and outer heating elements of the heating unit, each of said designs having a different arrangement of colors to indicate different degrees of energization of the heating elements, each of said push buttons comprising a tubular member slidably mounted in a stationary sleeve, a plug through which light may pass closing the outer end of said tubular member, a reflector disposed in said tubular member behind said window in position to reflect light axially of said tubular member, one of said designs being disposed in each of said tubular members between the reflector and the plug carried thereby, a window in each of said sleeves in position to register with the window in the tubular member mounted in the sleeve when a push button is in an on position, and an electric light bulb mounted in position to project light through registering windows and against the reflector therebehind, each of said designs indicating which element or elements is energized and to what degree in accordance with the setting of said switch when a selected push button is in an on position.

ROBERT G. SHEIDLER.

REFERENCES CITED

The following references are of record in the file of this patent:

UNITED STATES PATENTS

| Number | Name | Date |
|---|---|---|
| 2,338,757 | Curran | Jan. 11, 1944 |
| 2,431,904 | Andrews | Dec. 2, 1947 |
| 2,437,555 | Rees | Mar. 9, 1948 |
| 2,450,399 | Sheidler | Sept. 28, 1948 |

OTHER REFERENCES

Bulletin, "General Electric Ranges," 1941 (page 7 used).